(12) United States Patent
Ruffa

(10) Patent No.: US 8,087,372 B1
(45) Date of Patent: Jan. 3, 2012

(54) FAIRLEAD FOR A TOW CABLE HANDLING SYSTEM

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 12/752,438

(22) Filed: Apr. 1, 2010

(51) Int. Cl.
*B63B 21/16* (2006.01)
(52) U.S. Cl. .......................... 114/254; 254/389; 254/390
(58) Field of Classification Search .................. 114/243, 114/245, 253, 254, 293, 294, 199; 242/397.3; 254/389, 390, 391
See application file for complete search history.

(56) References Cited

U.S. PATENT DOCUMENTS

| | | | |
|---|---|---|---|
| 1,515,418 A | 11/1924 | Smith | |
| 2,449,235 A | 9/1948 | Krupp | |
| 3,801,071 A * | 4/1974 | Barron | 114/254 |
| 3,809,334 A * | 5/1974 | Beurer et al. | 242/397.3 |
| 3,892,386 A * | 7/1975 | Hogan | 114/254 |
| 3,988,810 A | 11/1976 | Emery | |
| 4,296,917 A | 10/1981 | Day | |
| 4,364,812 A | 12/1982 | Inoue | |
| 4,489,491 A | 12/1984 | Gregson | |
| 4,635,875 A | 1/1987 | Apple | |
| 5,609,120 A * | 3/1997 | Eronen | 114/253 |
| 6,044,787 A * | 4/2000 | Elmbo | 114/242 |
| 6,694,663 B1 | 2/2004 | Drury | |
| 6,698,374 B1 * | 3/2004 | Van Der Laan | 114/253 |

* cited by examiner

*Primary Examiner* — Lars A Olson
(74) *Attorney, Agent, or Firm* — James M. Kasischke; Michael P. Stanley; Jean-Paul A. Nasser

(57) ABSTRACT

A handling system with an improved fairlead is provided for protecting a tow cable wherein the cable breaking strength exceeds the system-rated tension load; the fairlead being positioned collinearly between the system bellmouth and winch. A guide slot passes through the fairlead positioning the cable higher than the winch release point and bellmouth entry point, maintaining the cable down-slope as the cable exits the fairlead. The slot has a hemispherical portion tapering inward to a groove extending downward. Near the groove bottom, at the fairlead end nearest the bellmouth, is a cutting device. Under tension, the cable rides in the hemispherical portion of the groove. If tension suddenly increases from a snag, the resulting force drives the cable down into the groove where the cable is cut by the device, separating before the force damages the system. The constrained cable end is securely held in place by the taper.

15 Claims, 2 Drawing Sheets

FAIRLEAD FOR A TOW CABLE HANDLING SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to an improved fairlead for a tow cable handling system and more particularly to a fairlead that protects the handling system components even when the tow cable breaking strength exceeds the rated strength of the handling system.

(2) Description of the Prior Art

It is known in the art that ships employing tow cables require a cable handling system that is rated for a failure load higher than the breaking strength of the cable being used. This is because, in the unlikely event that a tow cable snags, cable tension can quickly approach the breaking strength of the cable. Ideally, an overstressed tow cable will break at midspan and not tax the handling system. A less desirable alternative is a case where a tow cable does not reach breaking strength because the winch shaft, the winch foundation or the fairlead foundation of the handling system first fails due to excess cable tension load.

Cable diameter is a major factor in towed sonar system design. A small diameter tow cable (i.e., less than 0.75" diameter) usually cannot achieve the depth needed for surface ship towed sonar system operations. A larger diameter cable will tow at an increased depth because as the cable diameter increases, the weight of the cable in the water increases faster than the hydrodynamic drag of the cable. However, the breaking strength of the cable, and the corresponding handling system load rating requirements, also increase with cable diameter. For example, a typical 1" diameter tow cable with a cross-sectional area of 0.7854 $in^r$ typically has a breaking strength of 40,000 lb or more. This breaking strength often requires a winch rated at 60,000 lb or greater in order to include an acceptable factor of safety, 1.5 in this case. The supporting deck and underlying foundation also need to have the same or a higher load rating.

Attempting to retrofit a 1" diameter cable to a legacy handling system designed for a 0.8" diameter cable in order to permit greater tow depth can create problems—even if the handling system winch has enough volume to accommodate the new larger cable. A typical 0.8" diameter cable has a breaking strength of 25,600 lb. The handling system for the 0.8" diameter cable would be designed to incorporate a typical breaking strength 1.5 factor of safety load rating of 38,400 lb. The 40,000 lb breaking strength of the new 1" diameter cable will exceed this handling system rating which in most cases is fixed and cannot be changed, thus risking catastrophic failure of the handling system upon the occurrence of a cable snag.

One known approach to overcome the excessively high cable breaking strength problem involves simply letting the cable unreel freely from the winch if a cable snag occurs. Unfortunately, with this approach, the rotational inertia of the typical winch usually prevents the winch from speeding up fast enough to relieve the momentary tow cable tension surge. The time required to unlock the winch or release the brake is also non-negligible, and would require automated detection of any tension surges in order to preclude a delayed response.

Other known approaches to resolving the tension forces caused by a snag are to use a guillotine-type mechanism to quickly cut the cable mechanically or to employ a cutting torch. However, a typical tension surge occurs so quickly (typically in a 200 millisecond spike) that the response time of the cutter or torch system may not be fast enough. The tension surge duration is related to the difference in speed between the ship and the relatively immovable object snagging the cable, the cable length, and the cable stiffness. Any change in cable tension propagates along the cable at 5000 meters per second.

Guillotine mechanisms have been used previously in conjunction with helicopter-deployed dipping sonar systems that employ long synthetic cables of small diameter (typically 0.5" or less). Several factors make a guillotine approach feasible for such dipping sonar systems: (1) synthetic cables stretch more than steel cables before breaking; (2) a small diameter cable with low stiffness exhibits more stretch; (3) a long cable length is employed with dipping sonar systems increasing total stretch, and (4) the essentially stationary helicopter deploying the system allows both the stretch and the tension to increase slowly in the event of a cable snag.

Another common approach is to employ a mechanical fuse-like weak link that is incorporated into the tow cable and is designed to break at a tension lower than the breaking strength of the cable. It is a better approach than using a guillotine type device or depending on an unreeling winch, but a snag could still potentially occur above the fuse placement.

Whatever object snags the tow cable, the object will tend to slide backward along the cable, stop, and then generate a tension surge from that point back to the cable handling system on board the tow ship. The most likely snag stopping point along the cable is the distal end of the tow cable. What is needed is a rapid means to prevent the cable tension surge from damaging the tow cable handling system components.

SUMMARY OF THE INVENTION

Accordingly, it is a general purpose and primary object of the present invention to provide a system to rapidly reduce the tension load on a tow cable by quickly cutting the cable strength members if the towed sonar system tow body encounters a snag.

It is a further object of the present invention that the cutting device be simple, reliable and capable of inclusion in a fairlead.

It is a still further object of the present invention to have the invention be capable of being backfit on existing tow cable winch systems in conjunction with larger diameter, heavier tow cables to achieve greater towed sonar system tow body depth.

The objects described above are accomplished with the present invention by providing an improved fairlead that protects the tow cable handling system when the tow cable breaking strength exceeds the rated tension load strength of the handling system. The fairlead is positioned in collinear arrangement between the bellmouth and the winch of the tow cable handling system. A cable guide slot passing through the fairlead acts to position the tow cable somewhat higher than the height of the winch release point and bellmouth entry point to maintain the appropriate down slope for the tow cable as the cable exits the fairlead at both ends. The guide slot is defined by a hemispherical portion at the top tapering inwardly to a groove extending downward from there. Near the bottom of the tapered groove, at the aft end of the fairlead that is nearest the bellmouth is a fixed cutting device hereafter referred to as a "cutter".

Under normal tow tension, the cable rides in the upper hemispherical portion of the groove well above the cutter. But, if the cable tension suddenly increases due to a snag, the resulting downward force from the snag drives the cable into the groove where the cable strength members are cut by the cutter and the tow cable separates before the snag forces reach a level that can damage any of the components of the handling system. The cable portion that is still wedged in position in the groove remains securely held in place by the taper.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
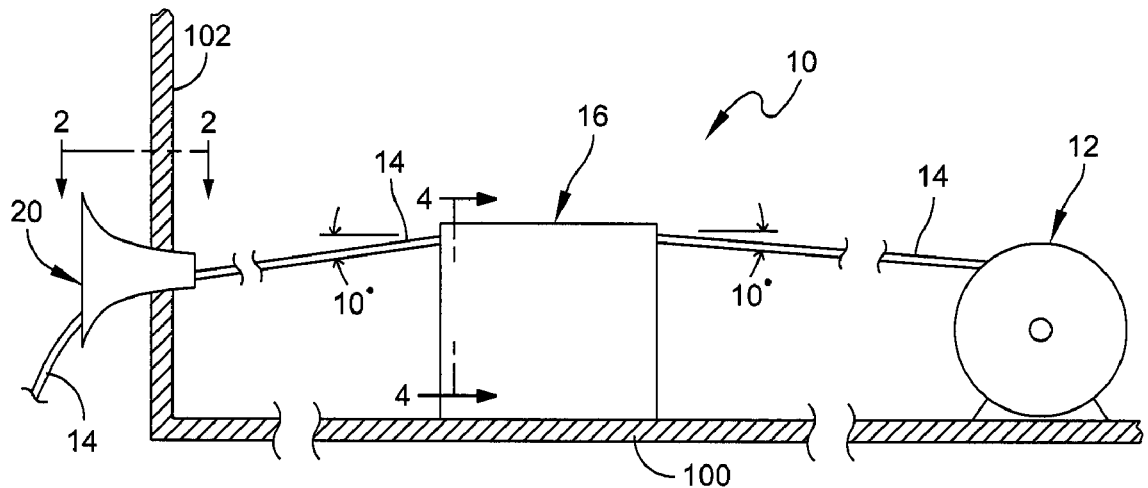
FIG. 1 depicts a tow cable handling system including an improved fairlead according to the teachings of the present invention.

Referring now to FIG. 1 there is shown an improved tow cable handling system 10 for use with surface ship towed sonar. The system 10 includes a linear forward-to-aft arrangement of a winch 12 with a tow cable 14 of preselected length and diameter wound about the winch; a fairlead 16 having a top face, a bottom face and forward and aft vertical faces, fairlead 16 being disposed aft of the winch 12 with the bottom face being affixed onto a deck 100; and a bellmouth 20 inserted through and fixedly attached to a stern bulwark 102. The fairlead 16 acts as a tow cable guide.

During deployment and retrieval from the winch 12; the tow cable 14 next passes through the fairlead, sloping upward at a ten degree angle from the winch to enter the proximal side of the fairlead that is positioned nearest the winch and exiting the distal side of the fairlead at a downward sloping ten degree angle. The winch 12 and the fairlead 16 are each capable of being fixedly attached to a ship deck 100 in a spaced apart relationship. The tow cable 14 continues on from the distal side of the fairlead 16 and is then guided overboard via the bellmouth 20 that provides passage for the cable through an aft bulwark 102. The fairlead 16 is nominally in-line between the winch 12 and the bellmouth 20 thereby allowing a straight run for deployment of the cable.

Figure 2:
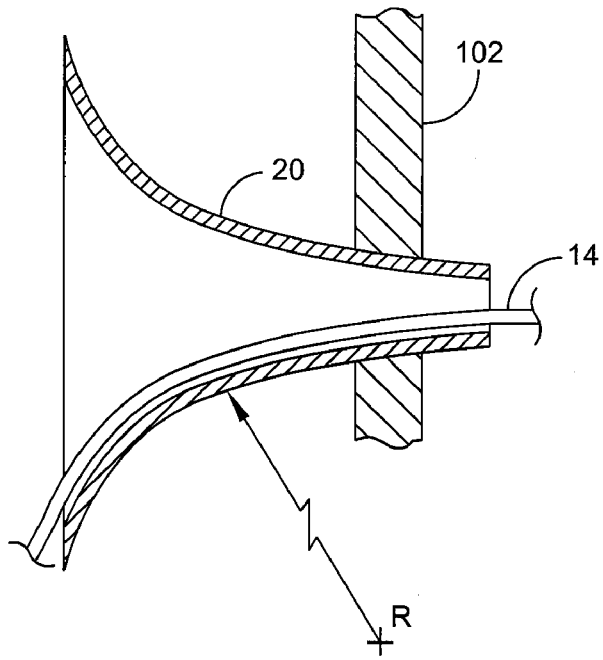
FIG. 2 depicts a detailed cross-sectional view of the bellmouth device of FIG. 1 as shown by the reference lines 2-2 depicted in FIG. 1.

FIG. 2 depicts a cross-sectional enlarged view of the bellmouth 20 of FIG. 1. The bellmouth 20 is a trumpet-like or bell-like opening in the aft bulwark 102 of the ship whose function is to minimize tow cable damage while it passes overboard by maintaining a minimum radius of cable curvature independent of the tow angle of the sonar. The recommended cable curvature radius 'R' for a bellmouth is thirty times the radius of the tow cable 14.

Figure 3:
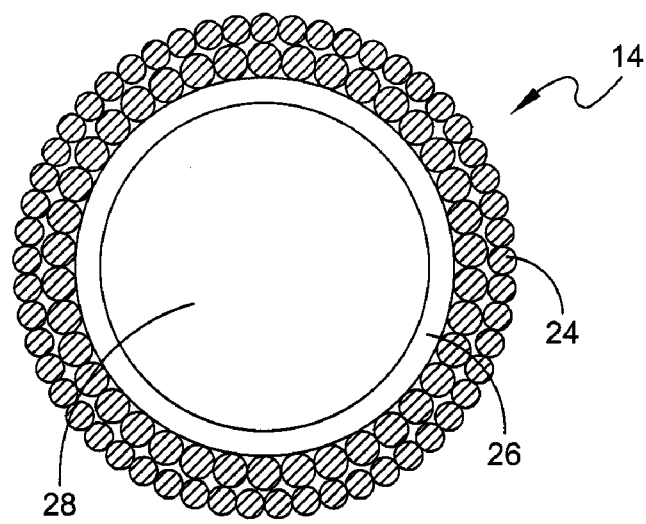
FIG. 3 depicts a cross-sectional view showing the outer layers only of a typical tow cable such as used in the system of FIG. 1.

FIG. 3 depicts a partial cross-sectional view showing only the outer layers only of a typical tow cable similar or equal to the tow cable 14. Alternate tow cables known to those skilled in the art may be used that would be compatible with the cutting operation of the present invention. The outer portion of the tow cable shown includes multiple layers of longitudinal strength members 24 (steel or Kevlar) disposed over a longitudinal core of polymer insulation 26. The interior volume 28 of the cable 14 typically includes a pre-selected plurality of components in combination (not shown) that are easily compressed, including mostly polymers for water block and insulation, optical fibers and copper wires—as desired for support of the particular tow application.

Figure 4:
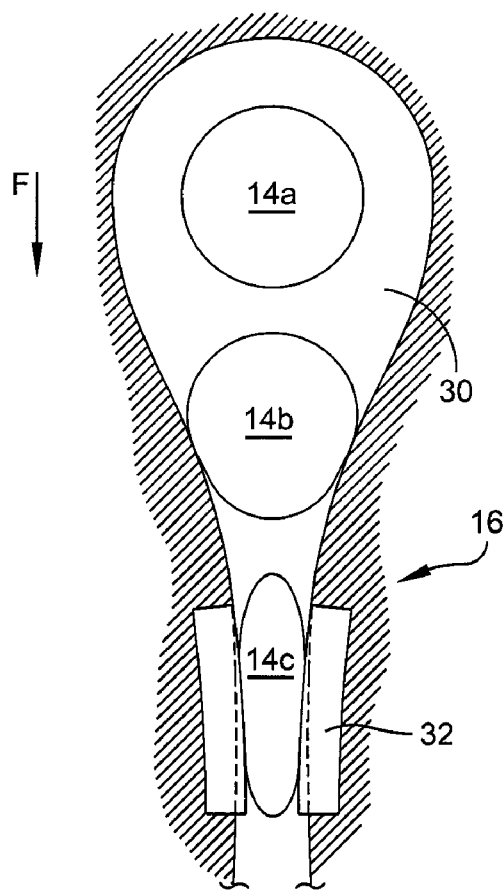
FIG. 4 depicts a partial cross-sectional view of the improved fairlead of FIG. 1 displaying a tapered groove and an embedded cutter as shown by the reference lines 4-4 depicted in FIG. 1.

FIG. 4 depicts the sequence that occurs if a rapid cable tension surge is produced by the tow cable 14 snagging. This tension surge generates a downward force 'F' that rapidly moves the tow cable 14 down into tapered groove 30 of the fairlead 16 until carbide cutting tool inserts 32 disposed near the bottom of groove 30 can sever enough of the strength members 24 of the tow cable 14 to enable the remainder of the cable to pull apart at a tension level below the system 10 factor of safety load rating. The groove 30 has a hemispherical top portion of a diameter greater than the diameter of the tow cable 14. The groove 30 necks down from the diameter of the hemisphere to a very narrow pre-selected width.

In FIG. 4, the tow cable 14 is shown in various stages of deformation (i.e., 14a, 14b and 14c) sequentially as the cable is driven down into the groove 30 by tension force 'F'. The downward motion, guided by the fairlead 16, causes the tow cable 14 to quickly clamp and then be cut with no delay in response time. The fairlead 16 maintains the required cable down sloping angle in the vertical plane (as shown in FIG. 1) being nominally in line with the bellmouth 20 and the winch 12. It is noted that the tow cable 14 also moves a limited distance in the athwartship direction between the flanges of the winch 12 as the cable unreels. This lateral movement is accommodated in the fairlead 16 by the added space in the upper hemispherical portion of the groove 30.

The tension surge drives the tow cable 14 into the tapered groove thereby avoiding any time delay. The moment arm generated by the cable tension makes necessary aft cross-structures (not shown) for fastening the fairlead 16 to the deck 100 in order to increase the moment of inertia of the fairlead structure thus preventing backward rotation of the fairlead 16. The angle of the tow cable 14 with respect to the fairlead 16 determines the downward force of the cable. For example, if the breaking strength of the tow cable 14 is 40,000 lb and the angle is ten degrees on each side of the fairlead 16, the downward force can approach F=2×40000 sin 10=13,900 lb.

The narrowly spaced surface area near the bottom of the groove 30 has at least two embedded carbide tooling inserts 32 designed as a cutter to cut the strength member strands 24. The aft part of the groove 30, the end nearest to the bellmouth 20, contains the cutting inserts 32; the forward part closest to the winch 12 does not. The tapered groove length from the cutter forward towards the winch serves to clamp the wedged winch side end of the severed tow cable 14 in place.

The cutting inserts 32 are adapted from known industrial tools used for cutting steel work pieces. A 40,000 lb cable tension and a 14,000 lb downward force will greatly aid the rapid severing of the strength members. Even if the cutting inserts 32 sever only half of the strength members, the remaining cable will break at 20,000 lb instead of at the rated 40,000 lb with the result of protecting the handling system.

The advantages and new features of the present invention are: the improved fairlead structure can be a replacement unit for legacy handling systems; the ability to safely retrofit a larger diameter cable to a legacy handling system permits greater cable tow depth even if the legacy system safety factor load rating does not exceed the cable breaking strength; the cable is clamped and cut at the speed of the tension surge before significant structure motion can occur, even without welding the fairlead to the deck; and the tapered groove in the fairlead holds the remaining cable thereby preventing the cable from "snapping back" after the cable is cut.

What has thus been described is an improved fairlead that protects the tow cable handling system even when the tow cable breaking strength exceeds the rated tension load strength of the handling system, the fairlead being positioned in collinear arrangement between the bellmouth and the winch of the tow cable handling system.

A cable guide slot passing through the fairlead acts to position the tow cable somewhat higher than the heights of the winch release point and the bellmouth entry point to maintain the appropriate down slope for the tow cable as the cable exits the fairlead at both ends. The guide slot is defined by a hemispherical portion at the top that tapers inwardly to a groove extending downward. Near the bottom of the tapered groove, at the end of the fairlead nearest the bellmouth, is a fixed cutting device.

Under normal tow tension, the cable rides in the upper hemispherical portion of the groove well above the cutting tool. But, if cable tension suddenly increases due to experiencing a snag, the resulting downward force from the snag drives the cable down into the groove where the cable is cut by the cutting device and separates before the snag forces reach a level that can damage any of the components of the handling system. The cable end that is still in the groove is securely held in place by the groove taper.

Obviously many modifications and variations of the present invention may become apparent in light of the above teachings. For example: the depth of the tapered groove can be varied; the number of cutting blades used, the depth in the groove and the angle of the blades are design choices to accommodate varying situations; the fairlead may be fastened to the deck by other means than welding; a torch can be used as a backup cable cutting device if desired and would be activated immediately when the cable clamps itself; and a backup protective cage may be constructed using many shapes and materials if so desired.

In light of the above, it is therefore understood that within the scope of the appended claims, the invention may be practiced otherwise than as specifically described.

What is claimed is:

1. A towed array handling system comprising:
a tow cable having a cross-section and a plurality of external longitudinal strength members disposed around the outer periphery thereof, said strength members capable of transmitting a tow force for required velocity through a fluid environment at a preselected depth;
a winch capable of attachment to a deck of a ship, said winch further having a rotatable reel for deploying and retrieving said tow cable;
a bellmouth capable of attachment to an aft bulwark of the ship and for guiding said tow cable therethrough;
a fairlead in alignment with said bellmouth for allowing passage therethrough of said tow cable, said fairlead having a top face, a bottom face and forward and aft vertical faces with said bottom face capable of attachment to the deck between said winch and said bellmouth, wherein said fairlead further comprises a horizontal tapered groove therethrough disposed near the top thereof for said tow cable to move within, said groove having an hemispherical top portion and a tapered lower portion extending downward therefrom to a depth, with said fairlead further having a preselected safety load rating proportional to a tensile strength of said tow cable wherein the preselected safety load rating for said fairlead is less than the tensile strength of said handling system with said fairlead capable of guiding said tow cable while protecting against tow cable tension surges; and a cutter, disposed at the aft vertical face of said fairlead and at said tapered lower portion of said groove, for facilitating rapid separation of said tow cable by reducing a cross sectional area of said strength members and hence overall cable breaking strength when a tension surge occurs in said tow cable wherein said tapered lower portion of said groove including said cutter at the aft end thereof provides for a clamping of the remainder of said cable when said cable is driven into said groove.

2. The system of claim 1 wherein said cutter comprises a plurality of carbide metal cutting blades set into opposite sides of said tapered portion of said fairlead groove such that as said tow cable is downward into said groove then the more that said cable strength members are severed thereby reducing the tension carrying capacity thereof.

3. The system of claim 2 wherein said bellmouth further comprises a generally curved shape, said curve having a radius which is thirty times the cable radius with said bellmouth also having an aperture therethrough to accommodate passage of said cable.

4. The system of claim 3 wherein said winch and said bellmouth are positioned such that said tow cable slopes upward from each to said fairlead at a preselected angle.

5. The system of claim 4 wherein said preselected tow cable angle is approximately ten degrees down from the horizontal.

6. The system of claim 5 wherein said winch allows for a degree of lateral motion for said tow cable as said tow cable pays in and out off of said winch.

7. The system of claim 1 wherein the preselected safety load ratings for said winch and said fairlead are approximately 1.5 times said tow cable tensile strength thereby allowing use with a preselected tow cable of larger diameter having a greater weight and tensile strength.

8. The system of claim 7 wherein said fairlead further comprises a horizontal tapered groove therethrough disposed near the top thereof for said tow cable to move within, said groove having an hemispherical top portion and a tapered lower portion extending downward therefrom to a preselected depth, said tapered lower portion of said groove further including said cutter at the aft end thereof while providing for a clamping of the remainder of the cable when said cable is driven down said groove.

9. The system of claim 8 wherein said cutter comprises a plurality of carbide metal cutting blades set into opposite sides of said tapered portion of said fairlead groove such that the further said tow cable is driven into said groove by said tension surge the more said cable strength members are severed thereby reducing the tension carrying capacity thereof.

10. The system of claim 9 wherein said bellmouth further comprises a generally curved shape, said curve having a radius which is thirty times the radius of said cable, said bellmouth also having an aperture therethrough to accommodate passage of said cable.

11. The system of claim 10 wherein said winch and said bellmouth are positioned such that said tow cable slopes upward from each to said fairlead at a preselected angle.

12. The system of claim 11 wherein said preselected tow cable angle is approximately ten degrees down from the horizontal.

13. The system of claim 12 wherein said winch allows for a degree of lateral motion for said tow cable as said tow cable pays in and out off of said winch.

14. A fairlead for use with a towed array handling system, said fairlead comprising:
 a top face;
 a bottom face, said bottom face capable of attachment to a deck of a ship;
 a forward vertical face;
 an aft vertical face; and
 a cutter disposed at the aft vertical face for facilitating rapid separation of a tow cable of the handling system by reducing a cross sectional area of strength members of the tow cable and hence overall breaking strength when a tension surge occurs in the tow cable;
 wherein said fairlead has a preselected safety load rating proportional to a tensile strength of the tow cable with said fairlead capable of guiding the tow cable while protecting against tension surges of the tow cable;
 wherein said fairlead further comprises a horizontal tapered groove therethrough disposed near said top face thereof for said tow cable to move within, said groove having an hemispherical top portion and a tapered lower portion extending downward therefrom to a depth, said tapered lower portion of said groove including said cutter at the aft end thereof while providing for a clamping of the remainder of the cable when said cable is driven into said groove.

15. The system of claim 14 wherein said cutter comprises a plurality of carbide metal cutting blades set into opposite sides of said tapered portion of said groove such that as said tow cable is downward into said groove then the more that said cable strength members are severed thereby reducing the tension carrying capacity thereof.

* * * * *